United States Patent [19]

Russell

[11] Patent Number: 5,182,323
[45] Date of Patent: Jan. 26, 1993

[54] WATER DISPERSIBLE PRESSURE SENSITIVE HOT MELTS

[75] Inventor: Gary S. Russell, Hampshire, England

[73] Assignee: ISP Investments Inc., Wilmington, Del.

[21] Appl. No.: 705,979

[22] Filed: May 28, 1991

[51] Int. Cl.$^5$ ............................................. C08F 220/02
[52] U.S. Cl. .................................... 524/322; 523/177; 523/407; 524/300; 524/318
[58] Field of Search ................ 523/177, 407; 524/318, 524/322, 300

[56] References Cited

U.S. PATENT DOCUMENTS

| | | | |
|---|---|---|---|
| 2,608,540 | 8/1952 | Paréet al. | 524/322 |
| 3,471,432 | 10/1969 | Krol et al. | 524/322 |
| 3,909,473 | 9/1975 | Okamura et l. | 524/300 |
| 4,331,576 | 5/1982 | Colon et al. | 524/271 |
| 4,338,229 | 7/1982 | Agarwal et al. | 524/399 |
| 4,743,238 | 5/1988 | Colon et al. | 604/361 |

*Primary Examiner*—Paul R. Michl
*Assistant Examiner*—John J. Guarriello
*Attorney, Agent, or Firm*—Marilyn J. Maue; Walter Katz; Joshua J. Ward

[57] ABSTRACT

A pressure sensitive hot melt adhesive contains thermoplastic rubber such as styrene isoprene copolymer, a copolymer of vinylpyrrolidone and vinylacetate, fatty acid and, usually, tackifying resin. The composition is water soluble or water dispersible which facilitates removal of labels by washing and recycling of scrap material in label production. The composition gives better properties, especially peel strength, than other water-soluble or dispersible hot melt compositions.

7 Claims, No Drawings

WATER DISPERSIBLE PRESSURE SENSITIVE HOT MELTS

FIELD OF THE INVENTION

This invention relates to a composition useful as a pressure sensitive hot melt adhesive. The invention also relates to labels and adhesive tapes making use of this adhesive. The composition is also useful as a deformable mass for certain medical applications.

BACKGROUND OF THE INVENTION AND SUMMARY OF THE PRIOR ART

Pressure sensitive hot melt adhesives are widely used. Most of such adhesives make use of thermoplastic rubbers which may be isoprene/styrene block copolymers or butadiene/styrene block copolymers. These rubbers are very hydrophobic. A drawback of such adhesives is that residues of such compositions become a very undesirable hydrophobic contaminant in water-based processes for recycling paper or fibreboard which has been treated with the adhesive. For instance if paper or board is treated with a hydrophobic pressure sensitive adhesive and used to make labels, the residue of the adhesive is a considerable obstacle to recycling any scrap material.

Pressure sensitive adhesives which are water dispersible are known. U.S. Pat. No. 4331576, Colon et al 1981, discloses hot melt pressure sensitive adhesives which contain vinyl pyrrolidone/vinyl acetate copolymers, ethylene/vinyl acetate copolymers, certain fatty acids, and rosin or tall oils. This patent explains that because of the water dispersability a label which is adhered with the adhesive can be removed on wetting the label.

Unexpectedly we have now found that it is possible to prepare water-soluble or water-dispersible hot melt pressure sensitive adhesives using the more conventional thermoplastic rubbers and the resulting compositions can give better tack, peel strength and cohesive strength than provided by the previously disclosed water-soluble or dispersible hot melt compositions. According to the present invention there is provided a hot melt composition comprising 3 to 50wt % of a thermoplastic rubber 10 to 50 wt % of a copolymer of vinyl pyrollidone and vinyl acetate 10 to 50 wt % of monocarboxylic fatty acid having 8 to 22 carbon atoms.

The balance of the composition can be provided by optional ingredients.

The thermoplastic rubber will generally be a copolymer of a monomer with one olefinic unsaturation and a monomer with two olefinic bonds especially a styrene/isoprene block copolymer or a styrene/butadiene block copolymer. An example of the former is the thermoplastic rubbers available from Shell under their registered trade mark Cariflex TR.

The amount of thermoplastic rubber is preferably from 4 to 20% by weight of the composition, and for higher peel strengths may be at least 6 wt %.

A suitable vinyl pyrrolidone/vinyl acetate copolymer is PVP/VA S-630 available from GAF Corporation.

This polymer contains vinyl pyrrolidone and vinyl acetate in approximate weight ratio of 6:4. These two monomers are randomly distributed in the polymer. The amount of this copolymer ranges from 10 to 50 wt % of the composition, preferably 15 to 40 wt %.

The third essential main component is fatty acid in an amount from 10 to 50 wt %.

Commercially available fatty acids are generally mixtures with a range of carbon chain lengths present. The fatty acid which is used may have a preponderance of shorter chains, from 10 to 14 carbon atoms, or of larger chains from 16 to 20 carbon atoms. The latter may include unsaturated chains but need not do so. Shorter chain fatty acid may be coconut derived. A suitable larger chain fatty acid is isostearic acid.

An ingredient which will usually be included is a tackifying resin in a quantity from 10 to 50 wt %, better 20 to 40 wt % of the composition.

Materials which can serve as tackifying resins include wood rosins, tall oils, esters of such rosins, and tall oils, and polyterpenes. Specific examples which are commercially available include Foral 85E from Hercules BV which is hydrogenated rosin, Staybelite Resin E from Hercules BV which is partially hydrogenated rosin, Piccolyte polyterpene resins from Hercules BV and Imprez aliphatic hydrocarbon resin available from ICI.

Compositions according to the invention will generally include antioxidant in an amount from which is a fraction of a percent. The compositions will often also include from 2 to 10 wt % of an ester plasticiser, such as dialkyl phthalates or alkyl benzoates.

Compositions according to this invention can be prepared simply by mixing the ingredient materials with heating and stirring to form a melt of them all. It may be found convenient to mix tackifying resin and the thermoplastic rubber together in a high shear mixer before mixing with the other ingredients. The mixing operation may be carried out under a blanket of inert gas such as nitrogen. This is conventional practice for making other hot melt compositions.

The principal application envisaged for the invention is use as a hot melt pressure sensitive adhesive. For this application the compositions will generally include tackifying resin. They may be applied to a paper substrate by conventional methods for application of hot melt adhesive. The compositions may be used in particular for the production of pressure sensitive labels and pressure sensitive adhesive tapes. Each of these products consists of a substrate which may be paper, fibreboard or a plastic film, coated with the adhesive composition embodying the present invention.

Another application for the compositions of the present invention is as a thermoplastic material which may be used in various medical applications. A quantity of composition according to the invention can be made large enough to sustain its own shape when at body heat or below and can be adhered to the human skin. This could be done to adhere a probe or sensor to the skin. Alternatively the composition could be impregnated with a drug for topical application which will progressively migrate from the composition into the skin to which the composition is adhering.

Embodiments of the invention will now be described by way of example:

A series of compositions were prepared using various proportions of the following commercially available ingredients:

Cariflex P1107 which is styrene/isoprene block copolymer available from Shell

Foral 85 which is hydrogenated refined wood rosin, a tackifying resin available from Hercules B.V.

Prifac 7901 which is a fatty acid derived principally from coconut oil and available from Unichema International. This fatty acid contains about 48% of lauric acid (12 carbon atoms) and 18% of myristic acid (14 carbon atoms). The remainder of the fatty acid is provided by acids of other chain lengths.

Dioctyl phthalate plasticizer.

Irganox 1010 or Topanol CA, which are sterically hindered phenol antioxidents available from Ciba-Geigy and ICI respectively.

The four compositions contain these materials in the amounts set out in Table 1 below. The Table also includes a comparative composition containing polyethylene glycol of average molecular weight 400 (PEG 400) and an ethylene/acrylic acid copolymer.

Samples of each adhesive composition were coated onto a polyester tape substrate such as Melinex (ICI) using a wire wound draw bar to spread the pre-heated melt onto the polyester film at a thickness of 25 μ and then laminating with silicone release paper.

Properties of the resulting films were then tested using standard tests prescribed by the Pressure Sensitive Tape Council.

In the test for peel strength the adhesive tape is pressed onto stainless steel using a roller of standard weight. It is then peeled off at an angle of 180° utilizing automated machinery to draw the tape off at a rate of 300 mm/minute and measure the applied force required. The results are expressed as grammes force per 25 mm of tape width.

Shear adhesion was measured by pressing tape onto a glass plate using the standard roller so that the tape was adhered to an area of specified dimensions at the edge of the plate. A standard weight was then attached to a length of the tape projecting from the edge of the glass plate which was clamped at an angle of 2° to the vertical. The time elapsed before the tape falls off from the plate was measured.

To assess tack a length of the tape was formed into a loop with the sticky side outwards. The loop is lowered onto a stainless steel surface until a prescribed length at the base of the loop is lying flat on the surface. No other pressure is applied to this adhesive film. The loop of tape is then drawn away from the stainless steel surface using automated machinery to draw the tape off at a rate of 300 mm/minute while measuring the applied force required.

Washability was assessed by coating a paper label with the adhesive composition, adhering that paper label to a glass surface and, later, removing the label by washing with water under standardised conditions. An assessment was made of the ease with which both the paper label and the adhesive were removed from the glass surface during washing.

Results for these tests are given in Table 1 which follows.

TABLE 1

| Ingredient | % by weight | | | | |
|---|---|---|---|---|---|
| | (1) | (2) | (3) | (4) | (5) |
| Cariflex P1107 | 5.6 | 10 | 16.7 | — | — |
| PEG 400 | — | — | — | — | 12.5 |
| Foral 85 | 33.3 | 35 | 37.5 | 31.2 | 12.5 |
| Prifac 7901 | 27.8 | 25 | 20.8 | 31.2 | 10.0 |
| PVP/VA S-630 | 27.8 | 25 | 20.8 | 31.2 | 35.0 |
| Irganox/Topanol CA | 0.2 | 0.2 | 0.2 | 0.2 | 0.2 |
| Dioctyl phthalate | 5.6 | 5 | 4.1 | 6.2 | 9.8 |
| Ethylene/acrylic acid copolymer | — | — | — | — | 20.0 |
| Peel Strength (g/25 mm) | 1500 | 2000 | 3000 | 400 | 800 |
| Tack: | High | High | High | High | High |
| Washability: | Excellent | Good | Good | Excellent | Good |
| Shear: | Low | Medium | High | Low | Medium |

It is apparent from compositions 1 and 4 in Table 1 that even a small percentage of the thermoplastic rubber gives a considerable enhancement of peel strength without destroying washability. Moreover composition 1 has greater peel strength than the somewhat different composition 5 which includes ethylene/acrylic acid copolymer.

I claim:

1. A hot melt composition which is water soluble or water dispersible comprising
   3 to 50 wt % of a thermoplastic rubber which is a block copolymer of monomers with one and two olefinic unsaturations,
   10 to 50 wt % of a copolymer of vinyl pyrrolidone and vinyl acetate, and
   10 to 50 wt % of monocarboxylic fatty acid having 8 to 22 carbon atoms wherein at least half the fatty acid has a carbon chain length of 10 to 14 carbon atoms.

2. A composition according to claim 1 comprising 4 to 20 wt % of the rubber.

3. A composition according to claim 1 containing 15 to 40 wt % of the fatty acid.

4. A composition according to claim 1 containing 15 to 40 wt % of the copolymer of vinyl acetate and vinyl pyrrolidone.

5. A composition according to claim 1 containing 10 to 50 wt % of tackifying resin.

6. A composition according to claim 1 containing 2 to 10 wt % of a plasticiser.

7. A composition according to claim 1 wherein the rubber is a styrene/isoprene block copolymer or a styrene/butadiene block copolymer.

* * * * *